United States Patent [19]

Kuszmaul

[11] Patent Number: 5,111,198
[45] Date of Patent: May 5, 1992

[54] METHOD OF ROUTING A PLURALITY OF MESSAGES IN A MULTI-NODE COMPUTER NETWORK

[75] Inventor: Bradley C. Kuszmaul, Cambridge, Mass.

[73] Assignee: Thinking Machines Corporation, Cambridge, Mass.

[21] Appl. No.: 629,026

[22] Filed: Dec. 18, 1990

Related U.S. Application Data

[63] Continuation of Ser. No. 172,625, Mar. 24, 1988, abandoned.

[51] Int. Cl.$^5$ .............................................. H04B 3/00
[52] U.S. Cl. .............................. 340/825.52; 370/94.1
[58] Field of Search ............ 340/835.02, 825.03, 340/825.5, 825.52; 370/58.2, 58.3, 61, 85.2, 91, 92, 93, 94.1, 15, 60

[56] References Cited

U.S. PATENT DOCUMENTS

| | | | |
|---|---|---|---|
| 4,071,908 | 1/1978 | Brophy et al. | 340/835.02 |
| 4,237,447 | 12/1980 | Clark | 340/825.52 |
| 4,345,326 | 8/1982 | Dieudonne et al. | 370/58 |
| 4,740,954 | 4/1988 | Cotton et al. | 340/825.02 |
| 4,745,593 | 5/1988 | Stewart | 370/15 |
| 4,771,281 | 9/1988 | Fox et al. | 340/825.03 |
| 4,783,657 | 11/1988 | Bouchard et al. | 370/58 |
| 4,796,023 | 1/1989 | King | 340/825.02 |

Primary Examiner—Donald J. Yusko
Assistant Examiner—Dervis Magistre
Attorney, Agent, or Firm—Pennie & Edmonds

[57] ABSTRACT

A message is generated at each of a plurality of source nodes, each message comprising at least address information identifying a first or destination node Di, and address information identifying a source node Si. The address information for the destination node is then used to route each message through the nodes of the communication network toward its destination node. At each node where two messages meet that are addressed to the same destination node, a second two messages are generated in place of the first two messages. One of these messages is routed toward the destination node while the other is routed toward an auxiliary node Ai whose address is specified in the message. If any further collisions take place between two messages routed to the same destination node, again two more messages are generated in place of the two colliding messages and one is routed toward the destination node while the other is routed toward another auxiliary node. The messages routed to the auxiliary node contain address information sufficient to route a message from the destination node to all the source nodes that originally addressed it.

8 Claims, 2 Drawing Sheets

1

METHOD OF ROUTING A PLURALITY OF MESSAGES IN A MULTI-NODE COMPUTER NETWORK

This is a continuation of application Ser. No. 07/172,625, filed Mar. 24, 1988, now abandoned.

CROSS REFERENCE TO RELATED PATENTS AND PATENT APPLICATIONS

Related applications are "Partitioning of A Very Large Scale Computer", originally filed May 31, 1985 as Ser. No. 06/902,290 (now abandoned), now Ser. No. 07/464,681, filed Jan. 16, 1990, and "Massively Parallel Processor," originally filed Oct. 28, 1986 as Ser. No. 06/924,090 (now abandoned), now Ser. No. 07/380,757 (now abandoned), filed July 17, 1989, both of which are incorporated herein by reference. Related patents are U.S. Pat. No. 4,598,400 for "Method and Apparatus for Routing Message Packets", U.S. Pat. No. 4,709,327 for "Parallel Processor/Memory Circuit", U.S. Pat. No. 4,805,091 for "Method and Apparatus for Interconnecting Processors in a Hyper-Dimensional Array", and U.S. Pat. No. 4,984,235 for "Method and Apparatus for Routing Message Packets and Recording the Roofing (Sic) Sequence", all of which are incorporated herein by reference.

BACKGROUND OF THE INVENTION

This relates to a multi-node communication network and in particular to a method of simultaneously routing a plurality of messages in such a network.

A common problem in a multi node communication network is that of coping with more than one message at a time. In some systems such as the Ethernet System if two messages are provided to the network at the same time, both messages are cancelled and the senders of those messages are left to try again. In other systems, one of the two messages is selected for transmission either arbitrarily or in accordance with a specified procedure and the other message is ignored.

Neither of the above procedures is very satisfactory in any communication network and these procedures pose particular problems in any system where there is any significant interaction between the message sources at the different nodes in the communication network.

Of particular interest in the present invention is the case where the different message sources are individual processors that are connected together by the communication network to form a parallel processor. As the number of processors in a parallel processor has increased, the problem of coping with a plurality of messages in the communication network has become more acute, and numerous techniques have been developed to improve the message handling capability of the network that interconnects such processors. One such technique has been to provide hypercube interconnection networks such as those described in the above referenced U.S. Pat. No. 4,598,400 at Column 4, line 16 to Column 8, line 29 and Column 11, line 12 to Column 38, line 68. In such networks, the processors are disposed at the nodes of a hypercube and interconnected by physical wires in a connection pattern that simulates the edge of a hypercube. As a result, there are many more paths between any pair of nodes in the hypercube, and consequently many more ways of routing messages from one node to another.

Nevertheless, it still happens that there will be collisions between messages being routed in the network. Some collisions are unavoidable because the messages are routed from a plurality of different sources to the same destination. Such routing patterns can be encountered frequently, as for example, where data stored in one node is to be used in calculations performed at a multiplicity of other nodes. In such circumstances, it has been found possible to combine the various messages that are routed from the multiplicity of nodes to the single destination and store the switch settings required to execute such routing. Information from the destination node can then be returned to the multiplicity of source nodes by routing the data backwards through the connection network using the switch settings in reverse order. Such an arrangement is described in detail in the above referenced U.S. Pat. No. 4,984,235.

The present invention is directed to another method of providing connections between a plurality of source nodes on one hand and a common destination node.

SUMMARY OF THE INVENTION

In accordance with the invention, a message is generated at each of a plurality of source nodes, each message comprising at least address information identifying a first or destination node Di, and address information identifying a source node Si. The address information for the destination node is then used to route each message through the nodes of the communication network toward its destination node. At each node where two messages meet that are addressed to the same destination node, a second two messages are generated in place of the first two messages. For convenience, we will refer to the first of the second messages as a forward message and to the second of the second messages as a backwards routing message. The forward message preferably comprises the address information for at least two nodes: the destination node Di and an auxiliary node Ai that is neither a source node nor a destination node. The backwards routing message comprises address information for three nodes: the node Ai and the two source nodes identified in the original two messages.

The forward message is then routed toward the destination node while the backwards routing message is routed toward the auxiliary node Ai whose address is specified in the message. If any further collisions take place between two forward messages routed to the same destination node, again two more messages are generated in place of the two colliding messages and one is routed as a forward message toward the destination node while the other is routed as a backwards routing message toward another auxiliary node. Again, the same rules are followed in selecting the address information in the two messages. The forward message contains address information for at least two nodes: the destination node Di and another auxiliary node Ai that is neither a source node nor a destination node and has not previously been used; and the backwards routing message comprises address information for that auxiliary node Ai, to which it is directed, as well as address information for the two auxiliary nodes identified in the two colliding forward messages.

Upon receipt of a forward message at the destination node, a message is generated in reply. That reply message is addressed to the auxiliary node Ai whose address is specified in both the forward message received at the destination node and in the backward routing message generated at the same time as the forward message received at the destination node. Upon receipt at that auxiliary node of the reply message from the destination node as well as the backwards routing message addressed to that node, two reply messages are generated using the address information contained in the backwards routing message for the other two nodes. These two reply messages are then sent to the auxiliary nodes specified by this addressing information. If other backwards routing messages have been received at those nodes, additional reply messages are generated and sent until reply messages are received at each source node that originally sent a message addressed to the destination node.

The foregoing message transmission technique has the advantage that the backwards routing information is stored as messages in the nodes of the communication network itself thereby avoiding the need for separate storage means for the routing information and providing a storage means that expands as needed with the size of the system.

It can be shown that the amount of storage required in such a system is bounded by a value which is proportional to the number of original messages being routed. In one embodiment of the invention, an auxiliary node is allocated for each message sent from a source node. In such embodiment, address information Ai for each such auxiliary node is advantageously included in the original message as sent and is used as part of the address information for the forward and backwards routing messages that are generated when messages collide. Alternatively, since the storage is not needed until collisions actually take place, it may be desirable to allocate such storage dynamically at the time of collision. In such case, the addresses of the auxiliary nodes Ai need not be included in an original message as transmitted from a source node but may be computed at the time the messages collide.

BRIEF DESCRIPTION OF THE DRAWINGS

These and other objects, features and advantages of the invention will be more readily apparent from the following description of a preferred embodiment of the invention in which.

DETAILED DESCRIPTION OF THE INVENTION

Figure 1:
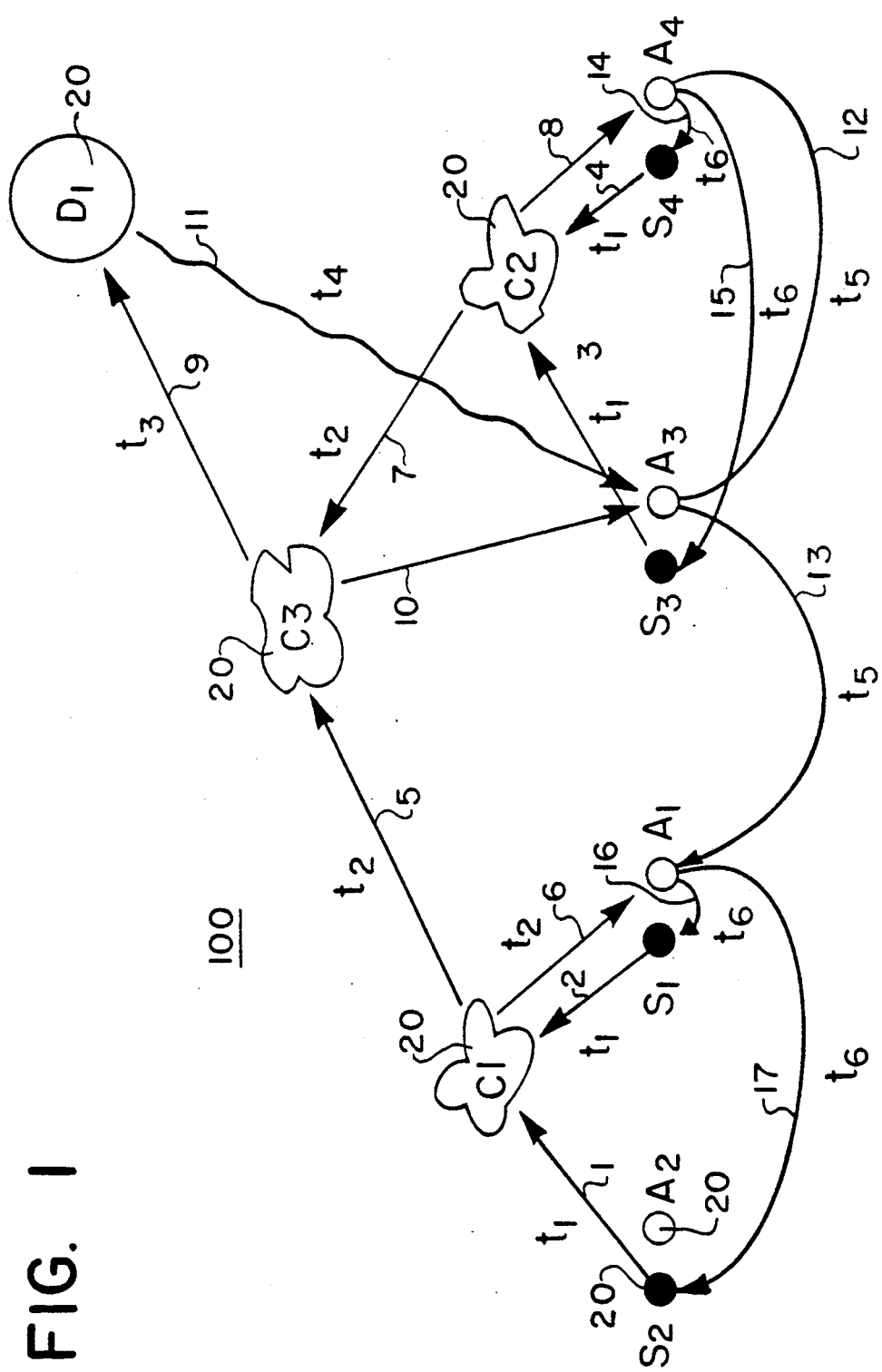
FIG. 1 is a diagram depicting message routing in a multi-node network in accordance with an illustrative embodiment of the invention.
Figure 2:
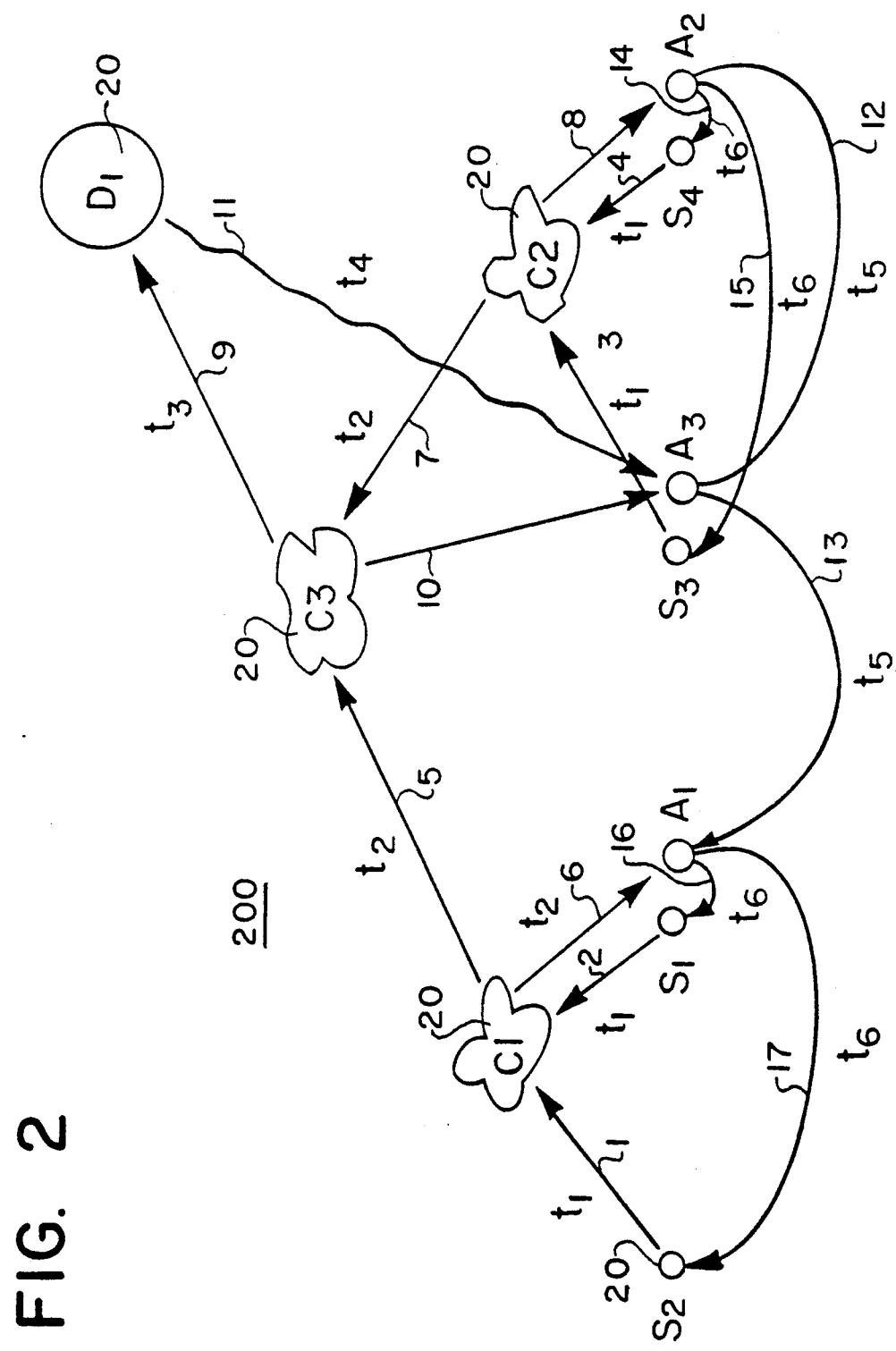
FIG. 2 is a diagram depicting message routing in a multi-node network in accordance with a second illustrative embodiment of the invention.

FIGS. 1 and 2 depict identical multiple node connection networks 100, 200 having a plurality of nodes 20 each of which constitutes a source and/or sink of data. The individual nodes 20 of the connection network are physically interconnected by an array of wires and logic circuitry (not shown) which make it possible to route messages from any node of the connection network to any other node. Illustratively, the nodes and interconnection network may be implemented in the processors and interconnection network of a parallel computer such as the CM-2 Connection Machine ™ Computer manufactured by Thinking Machines Corporation or any number of other computers which are known in the art. FIGS. 1 and 2 differ with respect to the function of certain nodes Ai as described below.

In accordance with the invention, each node communicates with the other nodes of the network using messages that contain address information for at least two and in some cases, three nodes. This information is represented by Di, Si, and Ai, where Di is address information for the destination node for the message generated at the ith source node, Si is address information for the ith source node, and Ai is address information for an auxiliary node that is neither a destination node nor a source node. Each message may also contain other information such as data or instructions which are being communicated to the destination node. For convenience, each message routed toward a destination node from a source node Si will be referred to as a forward message and will be understood to contain at least address information relating to two nodes: its destination node Di and the source node Si.

The forward messages are routed from their source nodes toward the destination node specified by the address information Di in each message. Different techniques are known in the art for using such information for routing purposes as disclosed for example in the above-referenced '400 patent at Column 28, line 6 to Column 42, line 18.

If two messages are addressed to the same destination node during the same routing cycle, they will collide at some node in the communication network. At that point, in accordance with the invention, the two messages are replaced by a second two messages. The first of these second messages is also a forward message. It contains address information for the destination node, Di, and address information for an auxiliary node Ai. The second of the second messages contains address information for the auxiliary node Ai as well as address information for the two source nodes identified in the two colliding messages. For convenience, we will refer to this second message as a backwards routing message.

The two second messages are then routed on, the forward message toward the destination node identified by the address information for that node contained in the forward message and the backwards routing message toward the auxiliary node identified by the address information for that node that is contained in the backwards routing message.

If any further collisions take place between two forward messages routed toward the same destination node, two more messages are generated in place of the two colliding messages; and one is routed as a forward message toward the destination node and the other as a backwards routing message toward another auxiliary node. The forward message contains address information for at least the destination node and the additional auxiliary node. The backwards routing message contains address information for the additional auxiliary node well as the address information obtained from the two colliding messages which directly or indirectly specify their source nodes.

Upon receipt of a forward message at the destination node, a message is generated in reply to the content of the forward message. For example, the forward message may be a fetch instruction which seeks retrieval of a number stored at the destination node. The reply message is addressed to the auxiliary node whose address is specified in both the forwarding message received at the destination node and in the backward routing message generated at the same time as that forwarding message. Upon receipt at that auxiliary node of the reply message from the destination node as well as the backwards routing message addressed to that node, two reply messages are generated using the address information contained in the backwards routing message. These two reply messages are then sent to the nodes specified by this addressing information. If other backwards routing messages have been received at those nodes, additional reply messages are generated and sent until reply messages are received at each source node that originally sent a message addressed to the destination node.

As is apparent from the foregoing description, the backward routing information is stored as messages in the auxiliary modes. This storage can be allocated in different ways. For example, an auxiliary node can be assigned to each source node from which an original message is transmitted. In this example of fixed storage assignments, it is advantageous to include address information for the associated auxiliary node in each original message sent from a source node. Alternatively, since the auxiliary storage is not needed until a collision takes place, it may be desirable to allocate such storage dynamically at the time a collision takes place.

A system using fixed storage assignments is illustrated in FIG. 1 and Table 1 for the case of four messages 1, 2, 3, 4 which are addressed to a common destination node D1 from four source nodes S1, S2, S3, S4. Uniquely associated with each source node is an auxiliary node A1, A2, A3, A4. As shown in FIG. 1, the messages 1, 2 generated at source nodes S1 and S2 are routed during time t1 to a node C1 where they collide with each other; and messages 3, 4 generated at source nodes S3 and S4 are routed during time t1 to another node C2 where they collide with each other. At each of nodes C1, C2 a forward message 5, 7, respectively, and a backwards routing message 6, 8, respectively, replace the colliding messages. During time t2 the forward messages 5, 7 are routed on to another node C3

TABLE 1

| time | message No. | direction | address information |  |  |
|---|---|---|---|---|---|
|  |  |  | node 1 | node 2 | node 3 |
| t1 | 1 | FORWARD | D1 | S1 | A1 |
|  | 2 | FORWARD | D1 | S2 | A2 |
| t2 | 5 | FORWARD | D1 | A1 | A2 |
|  | 6 | BACKWARD | A1 | S1 | S2 |
| t1 | 3 | FORWARD | D1 | S3 | A3 |
|  | 4 | FORWARD | D1 | S4 | A4 |
| t2 | 7 | FORWARD | D1 | A4 | A3 |
|  | 8 | BACKWARD | A4 | S4 | S3 |
| t2 | 5 | FORWARD | D1 | A1 | A2 |
|  | 7 | FORWARD | D1 | A4 | A3 |
| t3 | 9 | FORWARD | D1 | A3 | A2 |
|  | 10 | BACKWARD | A3 | A4 | A1 |
| t4 | 11 | REPLY | A3 | data |  |
| t5 | 12 | REPLY | A4 | data |  |
|  | 13 | REPLY | A1 | data |  |
| t6 | 14 | REPLY | S4 | data |  |
|  | 15 | REPLY | S3 | data |  |
| t6 | 16 | REPLY | S1 | data |  |
|  | 17 | REPLY | S2 | data |  | where they collide and the backwards routing messages 6, 8 are sent to nodes A1 and A4 where they are stored. The two colliding messages 5, 7 at node C3 are then replaced by two more messages, a forward message 9 that is routed toward the destination node D1 during time t3 and a backwards routing message 10 that is sent to node A3 during time t3 where it is stored.

As is apparent from Table 1, each original message 1, 2, 3, 4 comprises at least address information for a destination node Di, its source node Si and a unique auxiliary node Ai. As indicated above, it typically will also contain an instruction and/or data. At each collision, a forward message and a backwards routing message are generated. The backwards routing message comprises at least address information for an auxiliary node, to which the backwards routing message is directed, and address information for two other nodes which directly or indirectly specify the source nodes of the two colliding messages. The forward message comprises at least address information for the destination nodes, for the auxiliary node to which the backwards routing message is directed and for a second auxiliary node.

When the forward message 9 reaches the destination node D1, a reply 11 is generated containing the data sought by the forward message as well as address information for the node A3 which is obtained from the forward message received at the destination node. In time t4 this reply message 11 is sent to node A3. At node A3, the reply message is duplicated and the address information from the backwards routing message 10 that was sent to the node during time t3 is used to route the duplicated reply message to other nodes. In particular, the backwards routing message contains the address information for nodes A1 and A4. One of these addresses is added to each reply message 12, 13 and the message is sent on to node A1 or A4.

During time t2, backwards routing messages 6, 8 were also sent to nodes A1 and A4 where they were stored. When the two reply messages 12, 13 reach nodes A1 and A4, each of these messages is duplicated and the messages 14, 15, 16, 17 are routed to the nodes S4, S3, S1, S2, respectively, specified by the node address information in the backwards routing messages 6,8 stored at these nodes.

An example of dynamic allocation of storage is illustrated in FIG. 2 and Table 2. Again four messages 1, 2, 3, 4 are addressed to a common destination node D1 from four source nodes S1, S2, S3, S4. Messages collide and forward messages and backwards routing messages are generated as in the example of FIG. 1 and Table 1 except that the auxiliary nodes are allocated at the time of collision. As a result, the forward messages need contain address information for only two nodes: the destination node of the forward message and the auxiliary node to which the associated backwards routing message is directed. The backwards routing message contains address information for three nodes: the auxiliary node to which it is directed and two nodes, one from each of the colliding messages, which specify directly or indirectly the sources of the colliding messages. In the case where the colliding messages are original messages, these two nodes identify the source node as in the case of messages 6 and 8 of Table 2. In the case where the colliding messages are not original messages, these two nodes specify auxiliary nodes which indirectly specify the source nodes by means of other backwards routing messages that are stored at these nodes. Thus, message 10 includes addresses A1, A2 which specify the location of two auxiliary nodes where backwards routing messages 6, 8 can be found which identify source nodes S1, S2, S3, S4.

As will be evident from the foregoing description, numerous variations may be made in the practice of the invention. While the invention has been described in terms of a system having only four source nodes and one destination

TABLE 2

| time | message No. | direction | address information 1 | 2 | 3 |
|---|---|---|---|---|---|
| t1 | 1 | FORWARD | D1 | S1 | |
| | 2 | FORWARD | D1 | S2 | |
| t2 | 5 | FORWARD | D1 | A1 | |
| | 6 | BACKWARD | A1 | S1 | S2 |
| t1 | 3 | FORWARD | D1 | S3 | |
| | 4 | FORWARD | D1 | S4 | |
| t2 | 7 | FORWARD | D1 | A2 | |
| | 8 | BACKWARD | A2 | S4 | S3 |
| t2 | 5 | FORWARD | D1 | A1 | |
| | 7 | FORWARD | D1 | A2 | |
| t3 | 9 | FORWARD | D1 | A3 | |
| | 10 | BACKWARD | A3 | A1 | A2 |
| t4 | 11 | REPLY | A3 | data | |
| t5 | 12 | REPLY | A1 | data | |
| | 13 | REPLY | A2 | data | |
| t6 | 14 | REPLY | S1 | data | |
| | 15 | REPLY | S2 | data | |
| t6 | 16 | REPLY | S3 | data | |
| | 17 | REPLY | S4 | data | | node, it will be understood that it can be practiced with any number of source nodes directing messages to any number of destination nodes. Moreover, while the invention has been described in terms of a system in which only two messages collide at any one time, it will be understood that the invention can also be practiced in networks in which more than two messages collide at any one time. In such networks it will be necessary to provide in the backwards routing message address information which identifies directly or indirectly the source of each colliding message.

What is claimed:

1. In a data communication network in which messages are routed among a plurality of nodes, a method of routing messages from different source nodes to a common destination node comprising the steps of
   a. generating a message at each of i source nodes, each said message comprising at least the information Di, Si, where Di is address information for the destination node for the message generated at the ith source node, and Si is address information for ith source node,
   b. routing each message toward its destination node,
   c. at a node where at least a first two messages meet that are addressed to the same destination node D1 and comprise at least the information D1, S1 and D1, S2, where D1 is address information for the destination of the two messages and S1 and S2 are address information for the source nodes of the two messages, generating a second two messages in place of the first two messages, the first said message comprising at least the information D1, A1 and the second message comprising at least the information A1, S1, S2, where A1 is address information for an auxiliary node that is neither a destination node nor a source node,
   d. routing the first of said second messages toward the destination node, D1,
   e. routing the second of said second messages toward the auxiliary node, A1, whose address is specified in said second message,
   f. upon receipt of a message at a destination node, D1, generating a message in response thereto, said message comprising at least address information for an auxiliary node specified by the message received at the destination node,
   g. routing said message from the destination node through the nodes of the communication network toward said auxiliary node identified by the address information A1, using address information for the auxiliary node specified by the first of said second messages, and
   h. after receipt at node A1 of a message from the destination node and the second message comprising at least the information A1, S1, S2, generating two messages, one addressed to node S1 and the other to node S2.

2. The method of claim 1 wherein the address of the auxiliary node is generated at the time the first two messages meet.

3. The method of claim 1 wherein the address of an auxiliary node is part of the message routed from each source node.

4. In a data communication network in which messages are routed among a plurality of nodes, a method of routing messages from different source nodes to a common destination node comprising the steps of:
   a) generating a message at each source node, said message comprising at least address information for said destination node and address information for said source node,
   b) routing each message through the nodes of the communication network toward its destination node,
   c) at a node where at least a first two messages meet that are addressed to the same destination node, generating a second two messages in place of the first two messages,
   a first of said second messages comprising at least address information for said destination node and address information for a first auxiliary node that is neither a source node nor a destination node, and
   a second of said second messages comprising address information for said first auxiliary node and address information for each of the source nodes identified in the first messages,
   d) routing the first of said second messages toward the destination node whose address is specified in said second message,
   e) routing the second of said second messages toward the first auxiliary node,
   f) upon receipt of a message at the destination node, generating a message in response thereto that is addressed to an auxiliary node specified in the message received at the destination node,
   g) routing said message from the destination node through the nodes of the communication network toward said first auxiliary node using address information for the auxiliary node specified by the first of said second messages, and
   h) after receipt at said first auxiliary node of said message from the destination node and the second of said second messages, generating two messages one addressed to the source node of the first of the first two messages and the other addressed to the source node of the second of the first two messages.

5. The method of claim 4 wherein the address of the auxiliary node is generated at the time the first two messages meet.

6. The method of claim 4 wherein the address of an auxiliary node is part of the message routed from each source node.

7. In a data communication network in which messages are routed among a plurality of nodes, a method of routing messages from different source nodes to a common destination node comprising the steps of a. generating a message at each of i source nodes, each said message comprising at least the information Di, Si, Ai, where Di is address information for the destination node for the message generated at the ith source node, Si is address information for ith source node, and Ai is address information for an auxiliary third node uniquely associated with the ith source node and neither a destination node nor a source node,
  b. routing each message toward its destination node,
  c. at a node where at least a first two messages meet that are addressed to the same destination node D1 and comprise at least the information D1, S1, A1 and D1, S2, A2, where D1 is address information for the destination of the two messages, S1 and S2 are address information for the source nodes of the two messages and A1 and A2 are address information for the auxiliary nodes associated with the two source nodes, generating a second two messages in place of the first two messages, the first said message comprising at least D1, A1, A2 and the second message comprising at least the information A1, S1, S2,
  d. routing the first of said second messages toward the destination node, D1,
  e. routing the second of said second messages toward the auxiliary node, A1, whose address is specified in said second message,
  f. upon receipt of a message at a destination node, D1, generating a message in response thereto, said message comprising at least address information for an auxiliary node specified by the message received at the destination node,
  g. routing said message from the destination node through the nodes of the communication network toward said auxiliary node identified by the address information A1, using address information for the auxiliary node specified by the first of said second messages, and
  h. after receipt at node A1 of said message from the destination node and the second message comprising at least the information A1, S1, S2, generating two messages, one addressed to node S1 and the other to node S2.

8. In a data communication network in which messages are routed among a plurality of nodes, a method of routing messages from different source nodes to a common destination node comprising the steps of:

a) generating a message at each source node, said message comprising at least address information for said destination node, address information for said source node and address information for a first auxiliary node that is neither a source node nor a destination node,
  b) routing each message through the nodes of the communication network toward its destination node,
  c) at a node where at least a first two messages meet that are addressed to the same destination node, generating a second two messages in place of the first two messages,
  a first of said second messages comprising at least address information for said destination node and address information for each of said first auxiliary nodes identified in the first two messages, and
  a second of said second messages comprising address information for one of said first auxiliary nodes identified in the first two messages and address information for each of the source nodes identified in the first two messages,
  d) routing the first of said second messages toward the destination node whose address is specified in said second message,
  e) routing the second of said second messages toward the first auxiliary node whose address is specified in both of said second messages,
  f) upon receipt of a message at the destination node, generating a message in response thereto that is addressed to an auxiliary an auxiliary node whose address is specified in the message received at the destination node,
  g) routing said message from the destination node through the nodes of the communication network toward said first auxiliary node using address information for the auxiliary node specified by the first of said second messages, and
  h) after receipt at said first auxiliary node of said message from the destination node and the second of said second messages, generating two messages one addressed to the source node of the first of the first two messages and the other addressed to the source node of the second of the first two messages.

* * * * *